United States Patent [19]
Kuo

[11] Patent Number: 6,102,541
[45] Date of Patent: Aug. 15, 2000

[54] EYEGLASSES CONVERTIBLE INTO AN EYEGLASS CASE

[76] Inventor: Shui-Hua Kuo, P.O. Box 82-144, Taipei, Taiwan

[21] Appl. No.: 09/280,573

[22] Filed: Mar. 30, 1999

[51] Int. Cl.[7] ...................................................... G02C 5/08
[52] U.S. Cl. .................................. 351/63; 351/41; 2/454; 206/5
[58] Field of Search ................................ 351/63, 41, 118, 351/119, 112; 2/454; 206/5

[56] References Cited

U.S. PATENT DOCUMENTS

| | | | |
|---|---|---|---|
| 4,887,896 | 12/1989 | Akagi | 351/63 |
| 5,448,317 | 9/1995 | Huang | 351/63 |
| 5,640,218 | 6/1997 | Kanda | 351/63 |

*Primary Examiner*—Hung Xuan Dang
*Attorney, Agent, or Firm*—A & J

[57] ABSTRACT

Eyeglasses convertible into an eyeglass case, including a frame, seats, rotary blocks, upper and lower covers, and hinges. The frame has lenses and a larger nose pad at the center. The seats are provided on both ends of the frame and have upper and lower grooves on one side, with a screw hole disposed intermediate of the upper and lower grooves. The rotary blocks have a projection and can turn about an angle of 180 degrees in the seats. The rotary blocks further have a recess on one side with a through hole for receiving a screw rod, whereby the hinge is pivotally secured in the recess. The hinges are provided at front ends of the upper and lower covers that serve as casings of the eyeglass case or earpieces of the eyeglasses.

1 Claim, 5 Drawing Sheets

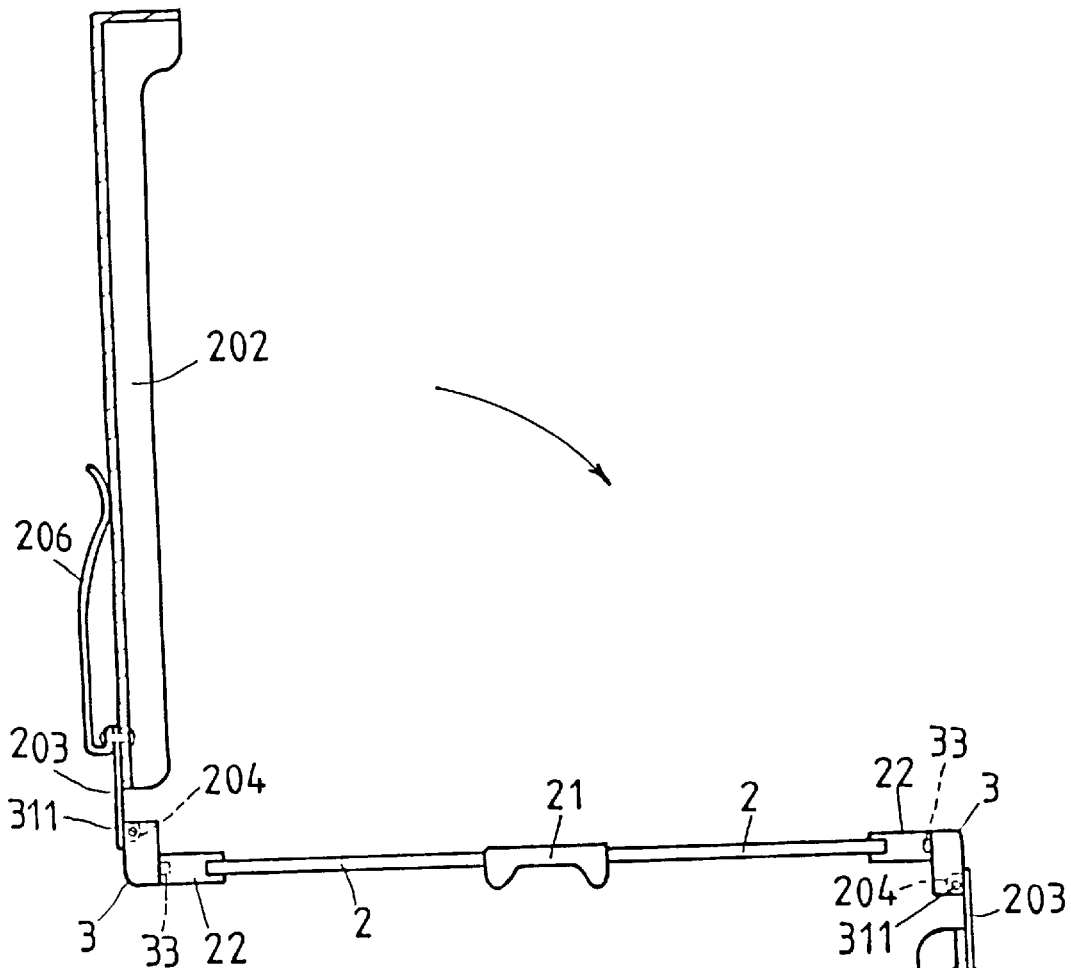
FIG. 4
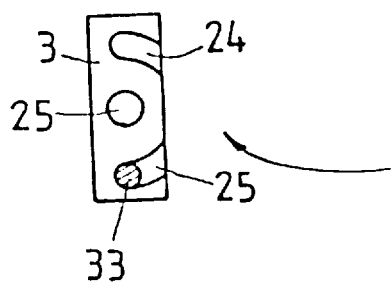
FIG. 4A

EYEGLASSES CONVERTIBLE INTO AN EYEGLASS CASE

BACKGROUND OF THE INVENTION (a) Field of the Invention

The present invention relates to a structure of eyeglasses, more particularly to a pair of eyeglasses that is convertible into a case for keeping the eyeglasses so as to facilitate carding and prevent possible loss thereof.

(b) Description of the Prior Art

Reference is made to FIG. 1, which shows the prior art. A case 1 is provided for keeping a conventional pair of eyeglasses 12. The case 1 has a fastening hook 11 on one side for attaching the case to a pocket or the like. As the eyeglasses 12 and the case 1 are two separate articles, the eyeglasses 12 have to be taken out from the case 1 for use or put back thereinto for keeping purposes when not in use. Besides, earpieces 121 of the eyeglasses 12 have to be extended or opened so that they can be worn on the user's face. Besides, if the eyeglasses 12 are lost or broken, the case 1 may become useless since it may not match other sizes of eyeglasses.

SUMMARY OF THE INVENTION

The present invention relates to a structure of eyeglasses, more particularly to a pair of eyeglasses that is convertible into a case for keeping the eyeglasses so as to facilitate carrying and prevent possible loss thereof.

A primary object of the present invention is to provide a pair of eyeglasses that is convertible into an eyeglass case to facilitate carrying and use.

Accordingly, a preferred embodiment of the present invention includes a frame, seats, rotary blocks, upper and lower covers, and hinges. The frame has lenses and a larger nose pad at the center to prevent slippage. The seats are provided on both ends of the frame and have upper and lower grooves on one side, with a screw hole disposed intermediate of the upper and lower grooves. The rotary blocks have a projection and can turn about an angle of 180 degrees in the seats. The rotary blocks further have a recess on one side with a through hole for receiving a screw rod, whereby the hinge is pivotally secured in the recess. The hinges are provided at front ends of the upper and lower covers that serve as casings of the eyeglass case or earpieces of the eyeglasses.

BRIEF DESCRIPTION OF THE DRAWINGS

FIG. 4 is a schematic view illustrating the pivotal tuning of the present invention;

FIG. 4A is another schematic view illustrating displacement of the projection with respect to the upper and lower grooves.

DETAILED DESCRIPTION OF THE PREFERRED EMBODIMENT

Figure 1:
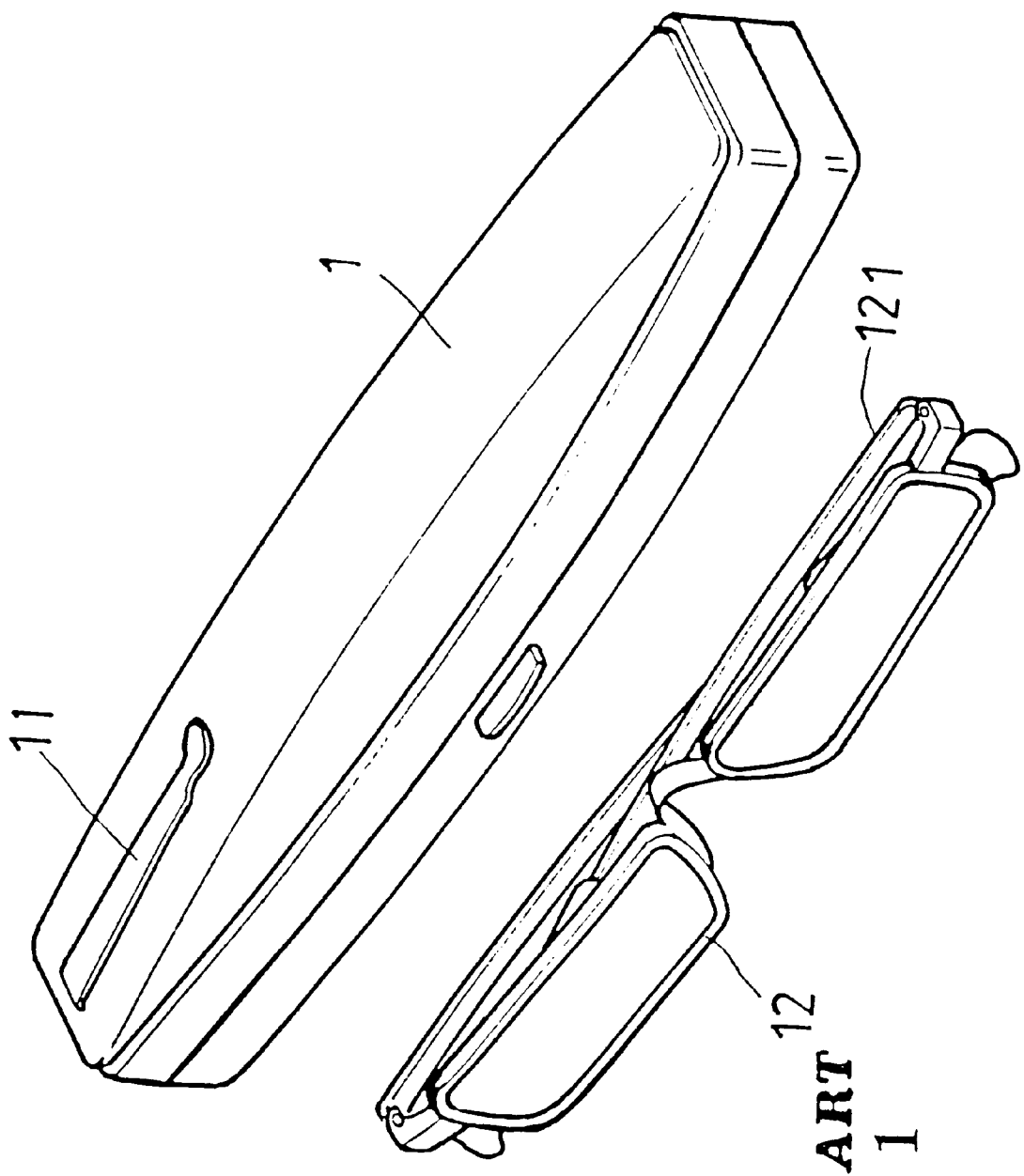
FIG. 1 is a perspective view of the prior art.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 2:
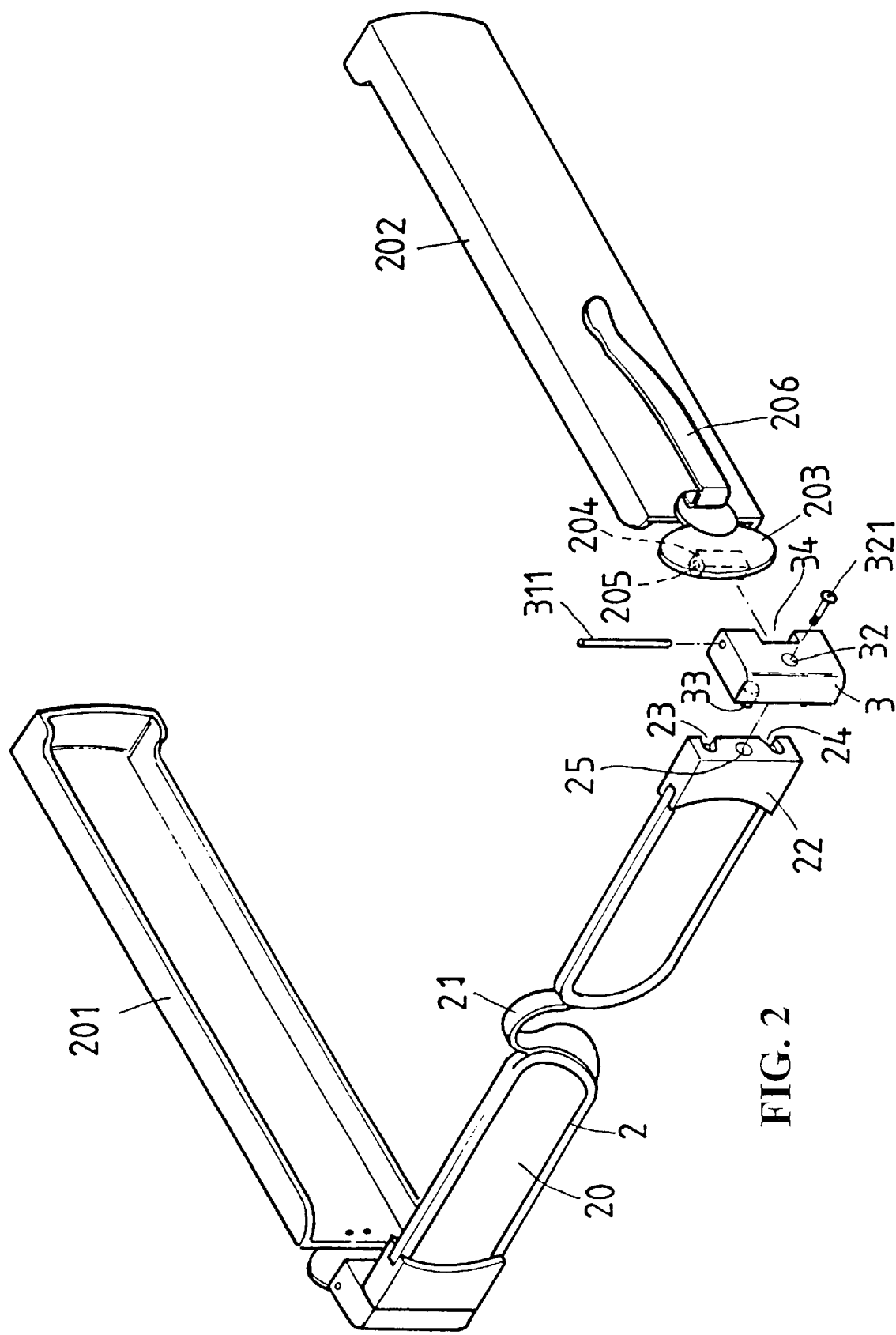
FIG. 2 is an exploded perspective view of the present invention.

With reference to FIG. 2, the present invention is shown to comprise a frame 2, two seats 22, two rotary blocks 3, an upper cover 202, a lower cover 201, and two hinges 203. The frame 2 includes lenses 20, left and right portions, and a larger nose pad 21 at the center between the left and right portions, adapted to provide a stable and elastic support and durability, and to prevent slippage. The seats 22 are provided at both ends of the frame 2, respectively. Each of the seats 22 includes upper and lower grooves 23, 24 on one side, with a screw hole 25 at the center. The seats 22 are provided to allow rotation of the rotary blocks 3. Each of the rotary blocks 3 is provided with a central screw hole 32 for passage of a screw 321. The screw 321 passes through the central through hole 32 to be locked in the screw hole 25 of the seat 22. In order that the rotary block can rotate about an angle of 180 degrees, it has a projection 33 at one corner for matching and engaging the upper or lower groove 23,24. When the rotary block 3 rotates, the projection 33 can slidably displace from the upper groove 23 to the lower groove 24, or vice versa. Furthermore, in order to cooperate with the path of rotation of the rotary blocks 3, the upper and lower grooves 23, 24 of the seats 22 have openings configured to be curved. Each rotary block 3 is further provided with a recess 34 on one side, which has a longitudinally oriented through screwhole 31 for passage of a screw rod 311. The upper and lower covers 202, 201 are adapted to be casings and earpieces of the eyeglasses of the present invention. Insert posts 204 are provided on inner sides of front ends of the upper and lower covers 202, 201 and are each centrally provided with a through hole 205 for passage of the screw rod 311. The screw rods 311 secure the insert posts 204 of the hinges 203 at the front ends of the upper and lower covers 202, 201 in the recesses 34 of the rotary blocks 3 so that the upper and lower covers 202,201 can rotate about an angle of 90 degrees with respect to the rotary blocks 3. Furthermore, the upper cover 202 is provided with a fastening hook 206 on an outer side thereof for attaching the eyeglasses to a pocket or the like.

Figures 3, 3A:
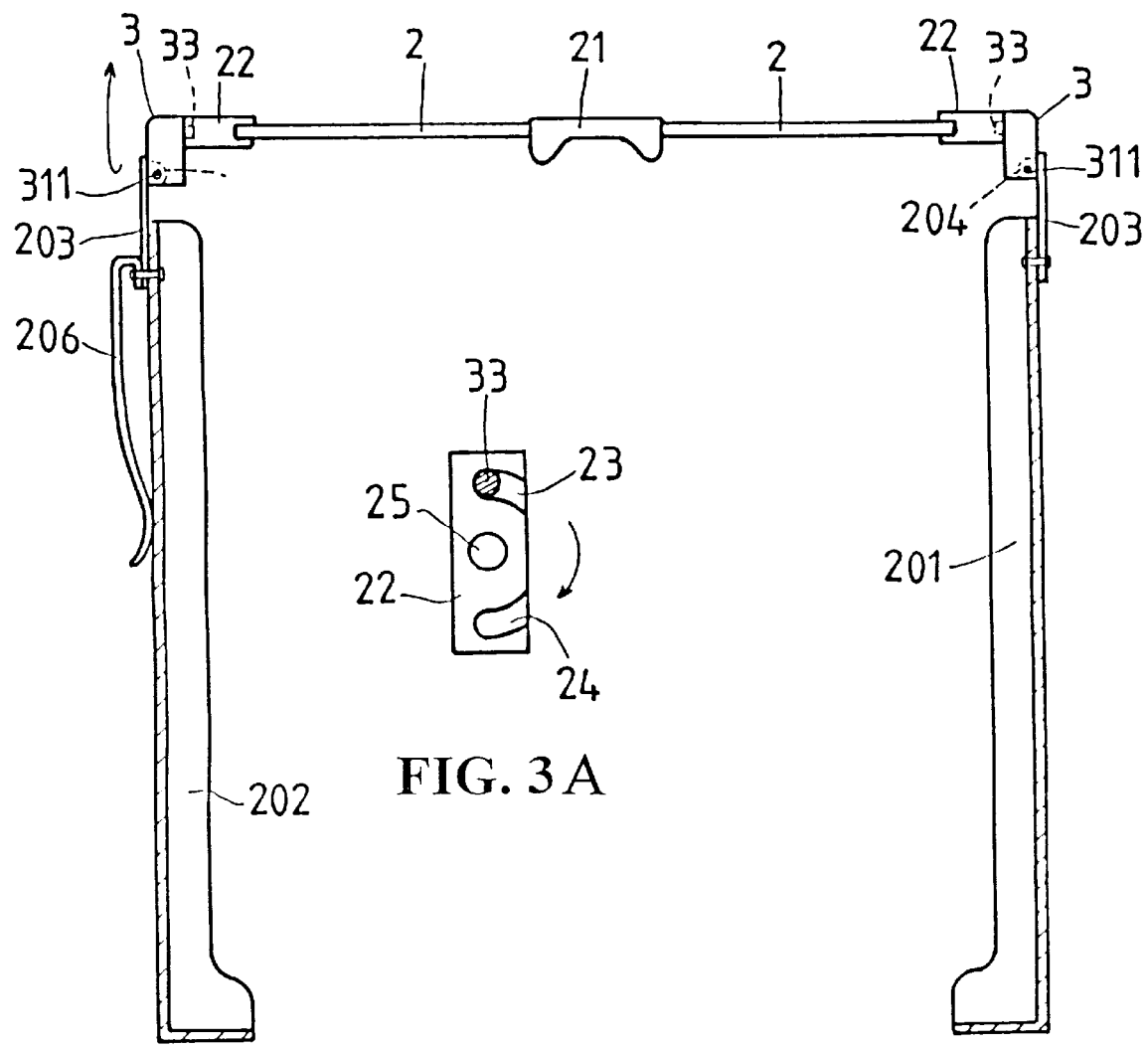
FIG. 3 is a cross-sectional view of the present invention when used as eyeglasses.
FIG. 3A is a schematic view illustrating displacement of a projection with respect to upper and lower grooves of a seat of the present invention.
Figure 5:
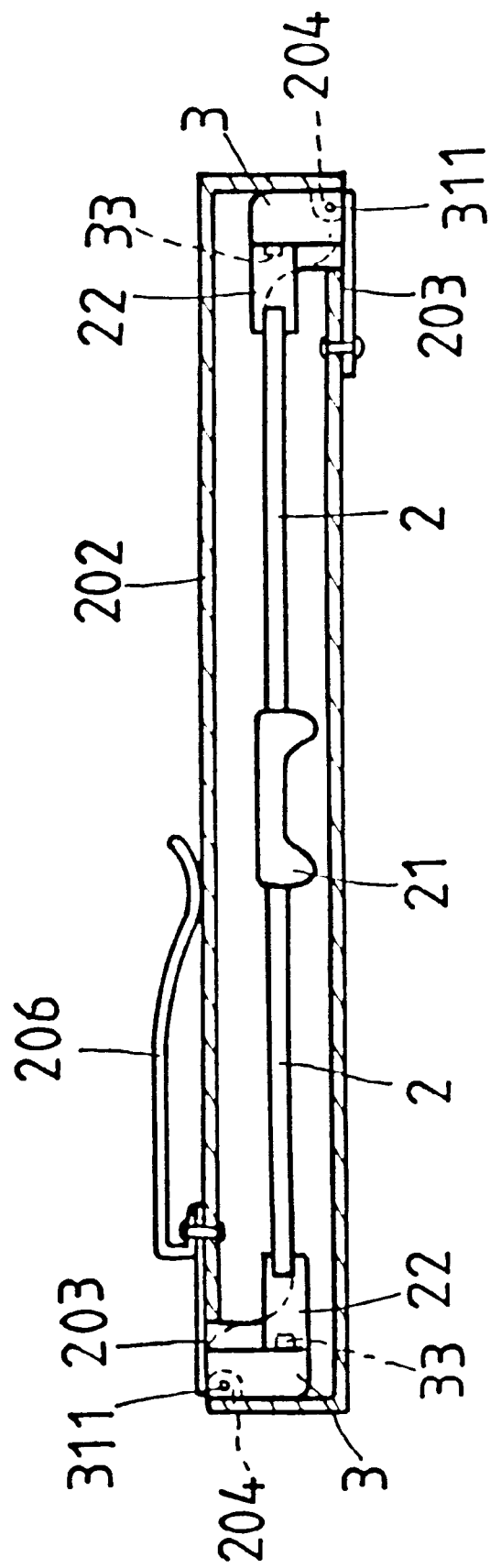
FIG. 5 is a sectional view of the present invention in a closed state as an eyeglass case.

FIG. 3 shows the eyeglasses of the present invention in an opened state of use and FIG. 3A is a schematic view illustrating displacement of a projection with respect to upper and lower grooves of a seat of the present invention. Referring to FIGS. 4 and 5, when it is desired to convert the eyeglasses of the present invention into a case, it is only necessary to turn the upper cover 202 along with the hinge 203 and the rotary block 3 connected thereto about an angle of 180 degrees, using the screw rod 321 as an axis. At this point, the projection 33 on the rotary block 3 will displace from the upper groove 23 to the lower groove 24 of the seat 22 and be positioned (see FIG. 4A), so that the shape of the frame 2, the upper cover 202 with the fastening hook 26, and the lower cover 201 resembles the letter "N". Then, the upper and lower covers 202, 201 turn about an angle of 90 degrees by means of the insert posts 204 of the hinges 203 that pivotally tun within the recesses 34 on one side of the rotary blocks 3 using the screw rods 311 as an axis. At this time, the upper and lower covers 202, 201 are brought to rest against front and rear sides of the frame 2, respectively, to envelop the same, as shown in FIG. 5. It can therefore be seen that the eyeglasses of the present invention are convenient to carry. If it is desired to resume the original shape of the eyeglasses, it is only necessary to turn the upper and lower covers in the opposite directions. Certainly, it should be understood that the upper and lower covers 202, 201 can be pivotally connected to the frame 2 to allow turning thereof by other means as that exemplified above.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. Eyeglasses convertible into an eyeglass case, comprising a frame, seats, rotary blocks, an upper cover, a lower cover, and hinge means, said frame having lenses and a larger nose pad at the center, said upper cover having a fastening hook on an outer side for attaching said eyeglasses to a pocket or the like, wherein said seats are provided at both ends of said frame, respectively, said seats including upper and lower grooves on one side, with a screw hole at the center, said upper and lower grooves each having a curved opening, said rotary blocks being each provided on one side of a respective one of said seats and being formed with a central screw hole for passage of a screw that passes through said central screw hole into said screw hole of a respective one of said seats, each of said rotary blocks having a projection on one side that is insertable into said upper or lower groove and can turn about an angle of 180 degrees with respect thereto, and a recess on the other side in the center, said recess being formed with a longitudinally oriented through screw hole for passage of a screw rod, said upper and lower covers being adapted to be earpieces of said frame, said hinge means being provided at front ends of said upper and lower covers, respectively, each of said hinge means having an insert post on an inner side thereof, said insert post having a through hole and being disposed in said recess of a respective one of said rotary blocks such that it can turn about an angle of 90 degrees using said screw rod as an axis, rotation of said rotary blocks permitting pivotal turning of said upper and lower covers so that said upper and lower covers can be closed towards front and rear sides of said frame to convert said eyeglasses into an eyeglass case or away therefrom in an extended state of use.

* * * * *